Dec. 10, 1929.  C. G. BUTLER  1,739,438
PORTABLE GREASE DISPENSER
Filed April 7, 1928   2 Sheets-Sheet 2
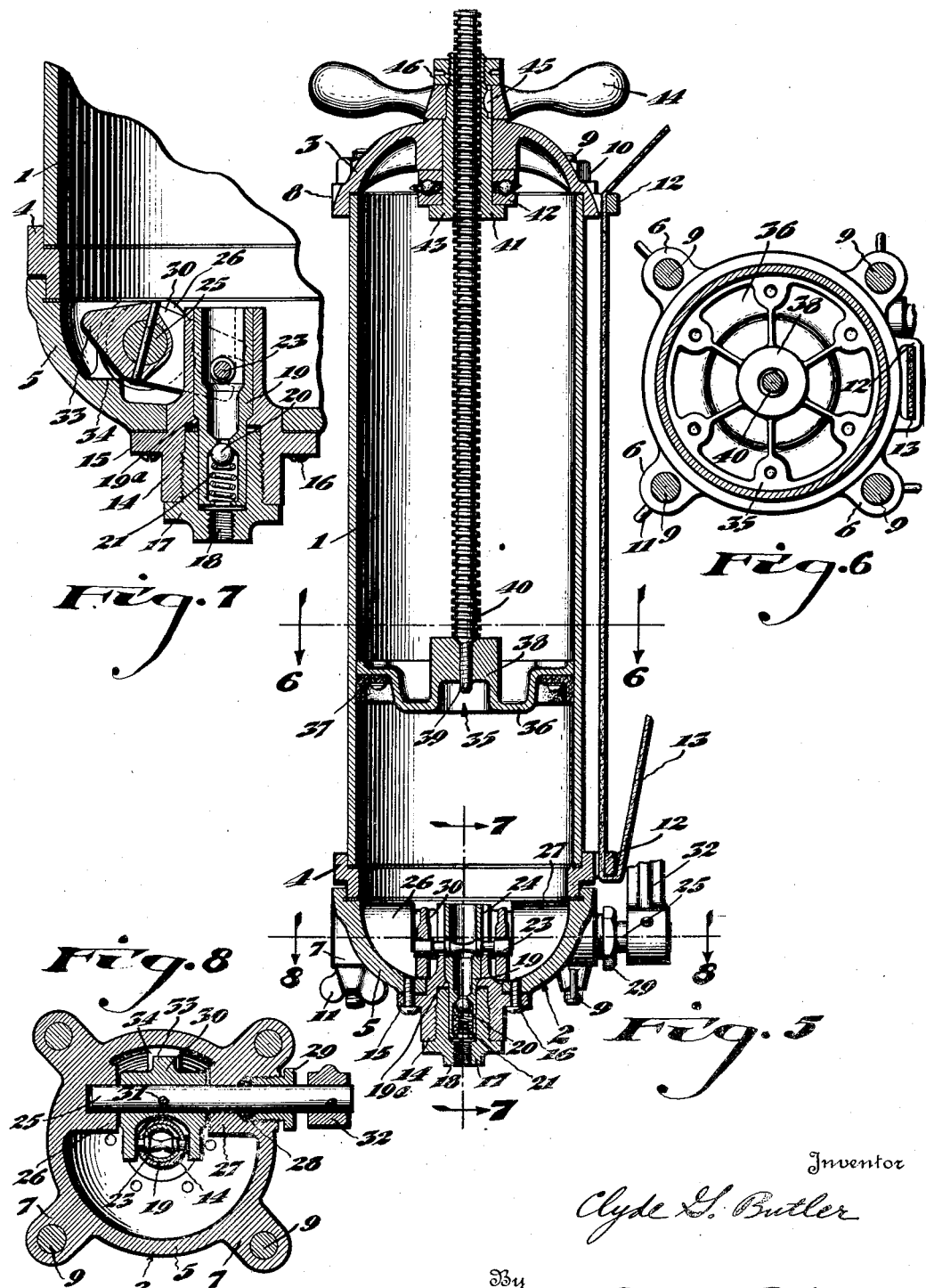
Inventor
Clyde G. Butler
By Wood & Wood Attorneys Patented Dec. 10, 1929

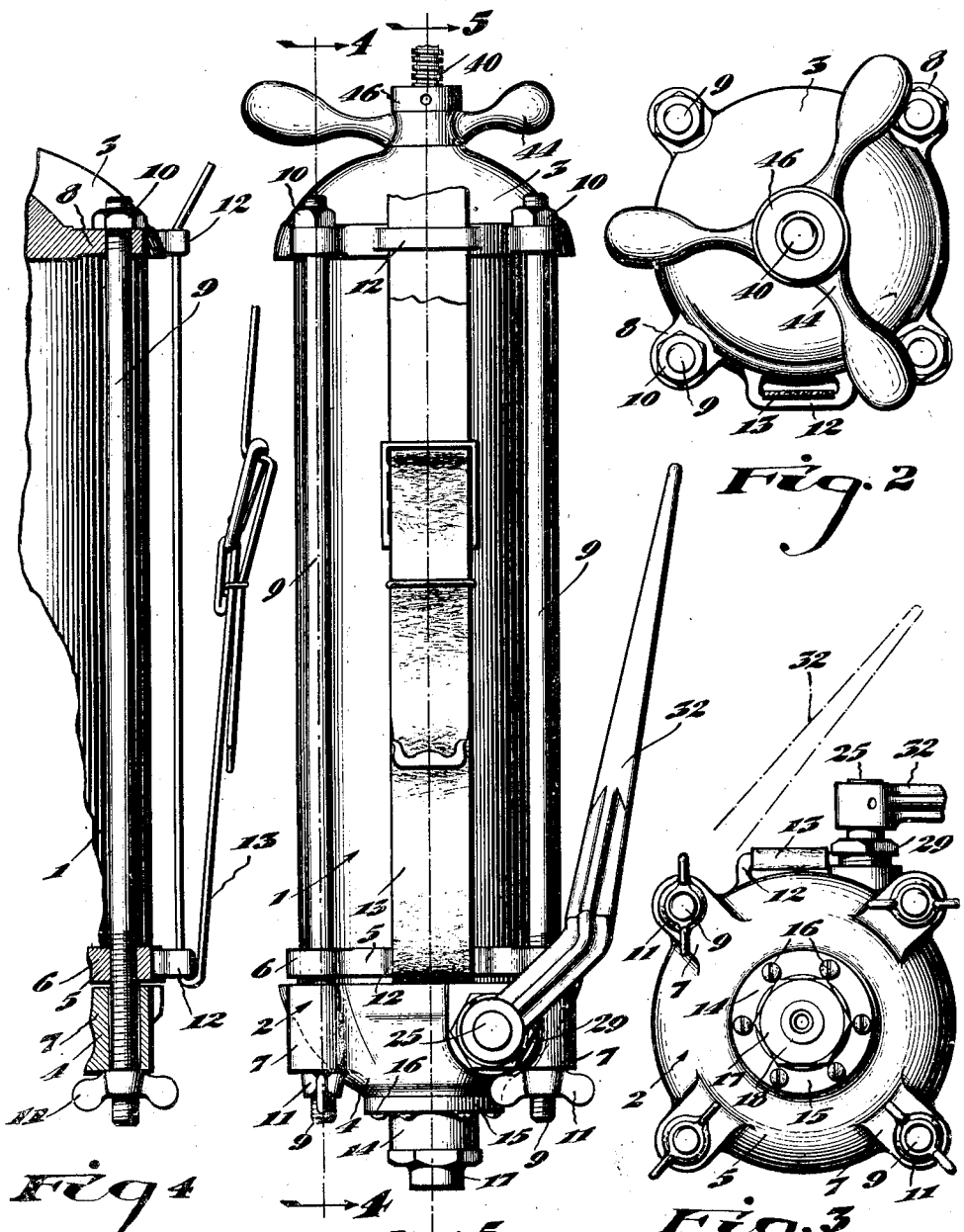

1,739,438

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

PORTABLE GREASE DISPENSER

Application filed April 7, 1928. Serial No. 268,357.

This invention relates to lubricating apparatus of the type wherein grease or other lubricant is discharged from a container through a hose and delivered to bearings by means of a coupler on the end of the hose and a cooperating fitting on each bearing.

This invention particularly relates to the grease container for such a system and the means for discharging grease therefrom under high pressure.

The object of the invention is to provide a portable container for grease which is capable of delivering grease under very high pressure so that it may be used to lubricate isolated or inaccessible bearings about machines or factory power installations.

Another object of the invention is to provide a lubricating device of this nature which is so constructed that the parts are conveniently arranged and disposed for operation when the device is hung from the shoulder.

Other objects and certain advantages will be more fully set forth in a description of the accompanying drawings, forming a part of this specification, in which:

Figure 1 is a side elevation of the improved lubricating apparatus, showing the position of the operating handle.

Figure 2 is a top plan view of the lubricating apparatus.

Figure 3 is a bottom view thereof.

Figure 4 is a fragmentary side view taken at right angles to Figure 1, showing the cylinder heads in section and the mounting of the draw bolt, as well as the attachment of the shoulder or carrying strap to the apparatus.

Figure 5 is a sectional view taken on line 5—5, of Figure 1, detailing the arrangement of the grease discharging mechanism within the apparatus.

Figure 6 is a sectional view taken on line 6—6, of Figure 5, detailing the grease packing and discharging piston and also showing the arrangement of the draw bolts for drawing the respective cylinder heads together on the cylinder.

Figure 7 is a sectional view taken on line 7—7, of Figure 5, detailing the small plunger piston for discharging the lubricant from the base of the container.

Figure 8 is a sectional view taken on line 8—8, of Figure 5, further detailing the large piston.

This lubricant dispenser comprises a container having a pump and outlet at one end and a member adapted to direct the grease to said pump or through said outlet if the pump is not used. Further, the pump is characterized by the fact that the piston reciprocates into the body of lubricant to withdraw quantities thereof as contrasted with sucking the lubricant through a tube.

More specifically the container comprises a cylindrical shell or barrel 1, which is mounted between two closure forming cylinder heads, one of which 2, supports mechanism for discharging the grease under high pressure and the other of which 3, supports mechanism for delivering the lubricant in the direction of the pressure generating pump and outlet. The cylinder head 2 is made in two pieces, a collar 4 fitting directly upon the end of the shell 1, and the end or closing member 5 fitting on the collar. The elements 4, 5 are provided, each with four laterally extending bosses 6, 7 respectively which have apertures through the parallel to the axis of the cylindrical shell. The cylinder head 3 on the other end of the shell is also provided with four bosses 8 apertured to align with the apertures in said bosses 6, 7. Through these aligned apertures pass tie rods 9 which are screw-threaded into engagement with the bosses 6 of the collar 4 and have nuts 10 upon the ends which extend through the bosses 8. By tightening nuts 10, the shell 1 is compressed between the cylinder head 3 and the collar 4. The member 5 is secured to the collar 4 by means of winged nuts 11, disposed upon the ends of the tie rods 9 on the outside of bosses 7. The cylinder head 3 and the collar 4 are provided with eyelets 12, through which passes a strap 13 adapted to pass over the shoulder of the user for carrying the lubricator about. It is to be noted that the member 5 is removable from the rest of the structure for filling with lubricant by unscrewing winged nuts 11 without otherwise disturbing the structure or its assembly.

A tubular member 14 is provided centrally with an external flange 15 which is secured to the outside of the center of the cylinder head member 5 by means of screws 16. This tubular member 14 is provided with two bores, the outer being of the greater diameter. In the outer bore is screwed a sleeve 17, the outer end of which is internally screw-threaded as at 18, to receive the end of a discharge hose (not shown). Within the sleeve 17 and within the inner end of the tubular member 14 is disposed a hollow piston 19, in the outer end of which is a ball valve 20, pressed by a spring 21 against a valve seat, so that lubricant under pressure may flow from the container out through said piston but not in a reverse direction. As disclosed, the metal at the outer end of the piston is upset to hold the spring 21 within the piston.

Through this piston passes a pin 23 which is engaged through slots 24 in the inner end of the tubular member 14.

The parts are so proportioned that the inner end of the piston on its inward stroke goes beyond the end of the tubular member 14 into the body of lubricant and this slot and pin arrangement above described guides the piston in its reciprocation. The pin 23 is also the means by which the piston is reciprocated. Outward movement of the piston 19 is limited by engagement of an intermediate shoulder 19ª formed thereon with a seat formed between the bores of the tubular member 14.

In detail, a rock shaft 25 is journaled in bosses 26, 27 located in the member 5. The outer boss 27 is provided with an outwardly facing bore of enlarged diameter in which is disposed packing 28 which is held in place by a gland 29.

On the inner portion of said rock shaft 25 between the bosses is secured a yoke 30 by means of a pin 31 passing through the yoke and rock shaft. This yoke has two arms slotted upon the ends which engage the pin 23 and straddle the tubular piston 19. On the outer end of the rock shaft 25 is secured a handle 32 which extends generally along the side of the shell 1. Therefore reciprocating said handle reciprocates said piston. The piston strokes are limited by an abutment 33 on the yoke member 30 which cooperates with an abutment 34 on the inside of the cylinder head 2. The inward stroke of the piston fills the same with grease and forces grease through it if already full. The outward stroke of the piston discharges the grease which has passed through the piston into the hose line.

The lubricant is forced into the environment of the pump and outlet by a plunger 35 which fits within the barrel or shell 1. This plunger comprises a disc 36 reinforced by ribs as shown in Figure 6 and has attached to its underside (as viewed in Figure 5) a leather washer or piston ring 37. In the center of the disc is a boss 38 into which is screw-threaded a stud extension 39 on the end of the feed screw 40. The other end of said feed screw extends through cylinder head 3 in which is located mechanism for translating the screw and feeding the plunger.

This mechanism comprises a nut 41 screw-threaded upon the feed screw, said nut flanged on the end within the cylinder head. A ball bearing or thrust bearing 42 is disposed between the nut flange 43 and the inside of the head itself.

To the outer end of said sleeve is secured a handle 44 by means of a key 45, and against the outside of said handle on the end of the sleeve is screw-threaded a lock nut 46. Therefore the revolving of said handle 44 translates the feed screw and the plunger in the shell to force the grease into the environment of the expelling pump. The grease itself is somewhat compressible due to the air in it so a single turning of the handle to put the grease under compression will be sufficient to permit operation of the pump without coordinate turning of said handle.

Said turning of the handle will positively discharge the grease through the outlet and hose even though the pump is not operated since no springs are interposed between the handle and the piston. If the bearing being lubricated is so tight or the fitting frozen so that the pressure generated by the turning of the handle is not sufficient then the pump can be used to force the lubricant through the bearing.

Having described my invention, I claim:

A lubricant discharging device, comprising, a shell, a closure for one end of said shell, a collar upon the other end of said shell, tie rods securing said closure said shell and said collar together, and a closing member supporting a pressure pump, said member detachably secured over said collar so that the device can be filled with lubricant when said member is removed and the pump can expel lubricant under pressure when said member is attached.

In witness whereof, I hereunto subscribe my name.

CLYDE G. BUTLER.